United States Patent [19]

Glatzle et al.

[11] Patent Number: 5,116,659
[45] Date of Patent: May 26, 1992

[54] EXTRUSION PROCESS AND TOOL FOR THE PRODUCTION OF A BLANK HAVING INTERNAL BORES

[75] Inventors: Rudolf Glatzle, Reutte; Ronald Huber, Vils; Thomas Schopf, Breiterwang; Michael Schretter, Ehrwald, all of Austria

[73] Assignee: Schwarzkopf Development Corporation, New York, N.Y.

[21] Appl. No.: 624,696

[22] Filed: Dec. 3, 1990

[30] Foreign Application Priority Data

Dec. 4, 1989 [AT] Austria ................ 2751/89

[51] Int. Cl.⁵ .............................. G32G 3/20
[52] U.S. Cl. ........................ 428/188; 72/260; 76/108.1; 76/108.6; 419/67; 428/596; 75/228
[58] Field of Search ......... 428/188, 596; 72/260; 419/67; 75/228; 76/108.6, 108.1

[56] References Cited

U.S. PATENT DOCUMENTS

| | | |
|---|---|---|
| 2,422,994 | 6/1947 | Taylor .................. 77/68 |
| 4,183,823 | 3/1989 | Bieneck ................ 408/59 |
| 4,583,888 | 4/1986 | Mori et al. ............ 408/59 |
| 4,698,205 | 10/1987 | Oskarsson et al. ........ 419/5 |
| 4,704,055 | 11/1987 | Guhring ............... 408/59 |
| 4,779,440 | 10/1988 | Cleve et al. ........... 72/260 |
| 4,831,859 | 5/1989 | Cleve et al. ........... 72/260 |
| 4,881,431 | 11/1989 | Bieneck ............... 408/144 |
| 4,955,764 | 9/1990 | Reinauer .............. 408/59 |

FOREIGN PATENT DOCUMENTS 0223909 6/1986 European Pat. Off. .
3601385A 7/1987 Fed. Rep. of Germany .
3636798A 4/1988 Fed. Rep. of Germany .

OTHER PUBLICATIONS

Patent Abstracts of Japan, vol. 13, No. 418 (M-871) [3766] Sep. 18, 1989.
Patent Abstracts of Japan, vol. 13, No. 305 (M-849) [3653] Jul. 13, 1989.
Patent Abstracts of Japan, vol. 14, No. 186 (M-962) [4129] Apr. 16, 1990.
English Abstract of DE 3636798A.

*Primary Examiner*—Stephen J. Lechert, Jr.
*Attorney, Agent, or Firm*—Morgan & Finnegan

[57] ABSTRACT

The invention relates to an extrusion process and an extrusion tool for the production of cylindrical metallic or ceramic blanks having one or more internal twisted longitudinal bores. A plasticized, pulverulent starting material, deformable by means of extrusion, is forced through a space formed by a die and a mandrel. One or more twisted central pins of a rigid material are fastened to the mandrel which ends before the inner space of the die. The central pins form the longitudinal bores in the blank. The positioning of the longitudinal bores is extremely symmetrical within the blank and uniformly achieved in the various individual blanks extruded using the same production batch.

11 Claims, 2 Drawing Sheets

EXTRUSION PROCESS AND TOOL FOR THE PRODUCTION OF A BLANK HAVING INTERNAL BORES

BACKGROUND OF THE INVENTION

The present invention relates to a powder-metallurgical extrusion process for the production of cylindrical metallic or ceramic blanks having one or more internal twisted longitudinal bores and an extrusion tool therefor.

An extrusion process and extrusion tool for producing a hard metal or ceramic drill blank having at least one twisted internal coolant bore are described in EP-A1 0-223 909. The coolant bores in the drill blank are formed by central pins fastened to a mandrel. The pins are straight and are produced from a flexible material such as copper or a copper alloy. In this process, the drill blank is turned by helical webs or grooves on the die's inner surface during extrusion through the die. As a result, twisted internal coolant bores are formed inside the drill blank, but spiral webs or grooves are also formed on the outer surface of the drill blank due to the helical webs or grooves on the die. Hence, the outer surface of the blank requires grinding to smooth the surface.

Another disadvantage of the above process is that, due to the flexibility of the pins, precise formation of the coolant bores within the drill blank is not possible. Also the position of the coolant bores within the individual blanks can vary greatly. Consequently, this may cause uneven wall thicknesses between the coolant bores and the blank's outer surface, sometimes resulting in the coolant bore being completely exposed during grinding of the outer surface, thus causing the blank to be rejected.

The object of the present invention is to provide a process for the production of a cylindrical blank having one or more internal twisted longitudinal bores, in which the position of the twisted longitudinal bores is as precise as possible within the cylindrical blank and uniform or nearly uniform for each blank produced.

SUMMARY OF THE INVENTION

This object is achieved by the process of the present invention which is carried out using pretwisted central pins which are fabricated from a substantially rigid material. The extrusion tool for application of the process has a die and a mandrel with one or more of the pretwisted pins attached thereto. The pin or pins are twisted with respect to the longitudinal axis of the die and have the diameter desired for the longitudinal bores, and protrude into the inner space of the die.

The resulting twisted longitudinal bores are precisely positioned within the cylindrical blanks and uniform blanks are produced. Surprisingly, to a substantial extent, it is possible to dispense with the use of additional spiral grooves or webs within the die. The twisting of the blank is accomplished exclusively by means of the twisted rigid central pin or pins. Consequently, the surface of the finished blank is smooth, and depending on the end use, no grinding or only slight grinding is required. If drill bits having spirally arranged outer surfaces are to be fabricated from the blank, there is no restriction on the positioning of these outer surfaces when they are made and they can be better adapted to the position of the twisted internal bores.

In exceptional cases, such as for example where the blanks have very large diameters and the longitudinal bores have relatively small diameters, it may be advantageous to intensify the twisting of the blank by including helically running webs or grooves on the inner surface of the die. However, in these cases it is adequate to provide these webs or grooves only on a very small area of the die's inner surface. It is not necessary for the webs or grooves to extend over the entire inner surface of the die.

The process according to the invention is suitable for the production of blanks from hard metals, steel, or ceramic. A plasticized, pulverulent starting material, which is deformable by means of extrusion, is forced through a space formed by the die and the mandrel of the extrusion tool described hereafter. The degree of plasticization of the starting material and the extrusion rate are chosen according to the diameter desired for blank, taking into account the diameter desired for the twisted longitudinal bore or bores. They are chosen so that the twisting of the longitudinal bores, predetermined by the pretwisted central pins, is substantially retained in the finished blank.

Suitable rigid materials for the production of the central pin or pins are hard metals or steel. Hard metals have proved successful, particularly in blanks having relatively large diameters. Steel is particularly suitable for blanks having smaller diameters, which as a rule have small diameter longitudinal bores. If a hard metal is used for the central pin or pins in blanks having small diameters, the pins may tear off due to the brittleness of the hard metal.

In certain cases, owing to the special dimensions of the blank and bore, it is not possible to avoid a slight untwisting of the predetermined shape of the bores by adjusting the degree of plasticization and the extrusion rate. This is because of a certain residual elasticity of the pin or pins. This typically occurs when the blanks have large diameters and the longitudinal bore or bores have small diameters. In this case it is advisable to twist the central pin or pins more than the twisting required in the final bore or bores. The untwisting which then occurs during extrusion causes the finished blank to be produced with the desired twisting of the bore or bores. The degree of the additional twisting required may be determined experimentally.

Since the positioning of the longitudinal bores in the finished blank is precise and uniformly produced, it is possible to produce drill blanks having internal coolant bores with an oval cross section and to position the longitudinal axis of the oval so that the wall thickness between bores and the outer surface is not too thin. In this way, a particularly good supply of coolant to the cutting edge is possible due to the cross-sectional enlargement.

BRIEF DESCRIPTION OF THE DRAWINGS

FIG. 1b is a cross-sectional view of the drill blank shown in FIG. 1a.

DESCRIPTION OF THE PREFERRED EMBODIMENTS

Figure 1A:
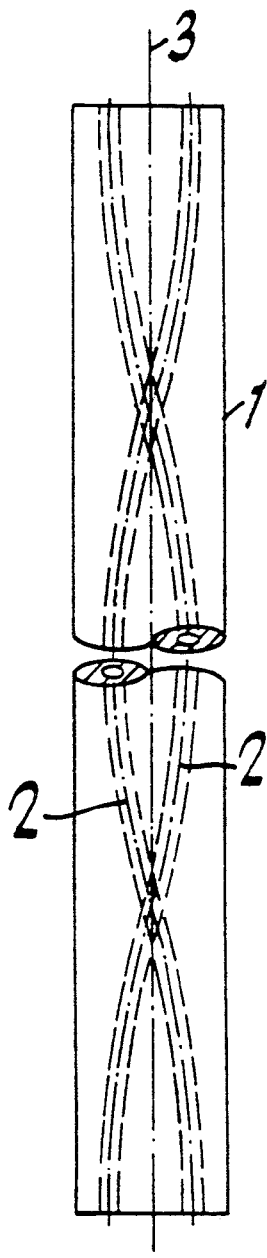
FIG. 1a shows a drill blank having two internal twisted longitudinal bores produced according to the present invention.
Figure 1B:
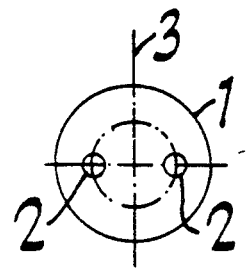

FIGS. 1a and 1b show a drill blank which has been produced by the process of the present invention. The drill blank 1 has two internal twisted longitudinal bores 2 which are arranged symmetrically with respect to the axis 3 of the drill blank 1.

Figure 2:
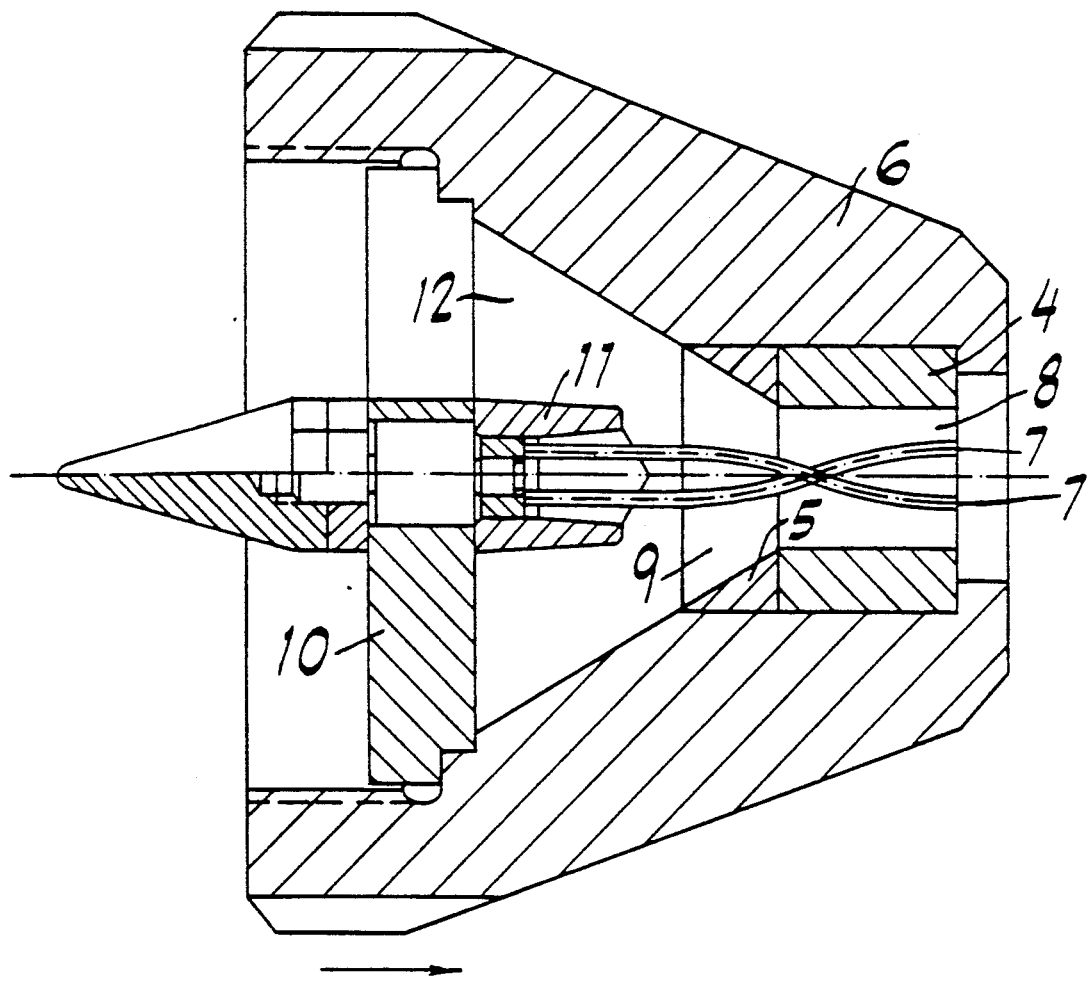
FIG. 2 shows an extrusion tool useful for the production of the drill blank shown in FIGS. 1a and 1b.

FIG. 2 shows an extrusion tool for use in the present invention. The tool has an approximately bell-shaped die mount 6. At the thinner delivery end of the tool are arranged an entry die 5 and a die 4. The die has an annular design with a cylindrical inner lateral area 8 which merges without any transition with the conically widening inner lateral area 9 of the entry die 5. The conical inner lateral area 9 of the entry die 5 in turn merges without any transition with the conical lateral area 12 of the die mount 6. At the entry end of the die mount 6 there is arranged a mandrel holder 10 which positions a mandrel 11 in a recess of the die mount 6 in such a way that the longitudinal axis of the mandrel 11 is in line with the longitudinal axis of the die 4 and entry die 5. The mandrel ends shortly before the entry die 5. At the end of the mandrel 11 there are helically twisted central pins 7 which protrude into the inner space of the entry die 5 and die 4. The central pins 7 are arranged in the direction of the longitudinal axis and symmetrical thereto.

EXAMPLE

This example describes the production of a hard metal drill die having internal twisted longitudinal bores for a coolant feed.

A mixture of hard metals containing 12% by weight Co, 4% by weight TiC, 7.5% by weight TaNbC, and the remainder WC was used as the starting material. The mixture was ground to an average particle size of 1–2 μm which is the size typically used in hard metal extrusion. The resulting powder was mixed with typical extrusion additives (for example, paraffin) and kneaded for at least 30 minutes at room temperature in a kneading mixer. The temperature was maintained constant during the kneading. The kneaded mixture was dried, evacuated, and precompacted at a pressure of at least 100 bar. The precompacted mixture was forced into the space formed between the mandrel (11) and the die mount (6) and then through the entry die (5) and die (4), whereby the precompacted mixture was compacted and cylindrically shaped in the die (4).

Due to the adequate plasticization of the kneaded mixture, the extrudate flowed around the helically twisted central pins (7) and coolant bores (2) were formed in the drill blank (1). The bores had the desired twisting and the desired position. The free length of the helically twisted central pins (7) between the end of the mandrel (11) and the beginning of the die (4) was 20 mm. This length gave optimum extrudate flow during extrusion for the chosen diameter of the drill blank, which was 13 mm., and resulted in optimum compaction of the blank.

Now that the preferred embodiments of the invention have been described in detail, various modifications of the extrusion tool shown and extrusion process described, may be made without departing from the spirit and the scope of the present invention. The present invention is limited only by the appended claims and not by the foregoing specification.

We claim:

1. An extruded cylindrical metallic or ceramic blank having a smooth surface and one or more internal twisted longitudinal bores prepared by a powder-metallurgical process, the process comprising the step of extruding a deformable powdered metallic or ceramic starting material through a space formed by a die and a mandrel, the mandrel having one or more rigid, helically twisted central pins for forming the internal twisted longitudinal bores in the blank, which pins protrude from the mandrel into the die in the direction of the exit end of the die.

2. The extruded blank of claim 1, wherein the blank has one precisely positioned internal twisted longitudinal bore.

3. The extruded blank of claim 1, wherein the blank has at least two internal twisted longitudinal bores symmetrically positioned within the bore.

4. The extruded blank of claim 3, wherein the deformable powdered metallic starting material is steel or a hard metal.

5. The extruded blank of claim 3, wherein the blank is used to machine a drill die and wherein the internal bores are used as a channel for a coolant.

6. The extruded blank of claim 4, wherein the blank is comprised of the hard metal.

7. The extruded blank of claim 2, wherein the blank has a smooth surface.

8. The extruded blank of claim 3, wherein the blank has a smooth surface.

9. The extruded blank of claim 1, wherein the blank has a smooth surface and one or more precisely positioned internal twisted longitudinal bores.

10. The extruded blank of claim 1, wherein the blank is steel and has a smooth surface and one or more precisely positioned internal twisted longitudinal bores.

11. The extruded blank of claim 1, wherein the blank is a hard metal and has a smooth surface and one or more precisely positioned internal twisted longitudinal bores.

* * * * *